(12) United States Patent
You et al.

(10) Patent No.: US 10,600,099 B2
(45) Date of Patent: Mar. 24, 2020

(54) INFERRING SERVICE PROVIDERS

(71) Applicant: Microsoft Technology Licensing, LLC, Redmond, WA (US)

(72) Inventors: Siyu You, Santa Clara, CA (US); Aman Grover, Sunnyvale, CA (US); Manoj Rameshchandra Thakur, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 544 days.

(21) Appl. No.: 15/048,845

(22) Filed: Feb. 19, 2016

(65) Prior Publication Data

US 2017/0243271 A1    Aug. 24, 2017

(51) Int. Cl.
*G06Q 30/00* (2012.01)
*G06Q 30/06* (2012.01)
*H04L 29/08* (2006.01)
*G06Q 50/00* (2012.01)

(52) U.S. Cl.
CPC ..... *G06Q 30/0617* (2013.01); *G06Q 30/0609* (2013.01); *G06Q 30/0625* (2013.01); *G06Q 30/0631* (2013.01); *G06Q 50/01* (2013.01); *H04L 67/20* (2013.01); *H04L 67/306* (2013.01)

(58) Field of Classification Search
CPC ........... G06Q 30/0617; G06Q 30/0625; G06Q 30/0631; G06Q 30/0609; G06Q 50/01; H04L 67/306; H04L 67/20
See application file for complete search history.

(56) References Cited

U.S. PATENT DOCUMENTS

| | | | | |
|---|---|---|---|---|
| 6,385,620 | B1* | 5/2002 | Kurzius | G06Q 10/10 |
| 7,529,689 | B2* | 5/2009 | Rowan | G06Q 30/06 |
| | | | | 705/26.1 |
| 8,209,235 | B2* | 6/2012 | Bickerstaff | G06F 17/30867 |
| | | | | 705/26.1 |
| 8,370,280 | B1* | 2/2013 | Lin | G06N 20/00 |
| | | | | 706/12 |
| 8,548,870 | B1* | 10/2013 | Herbette | G06Q 50/01 |
| | | | | 705/2 |
| 8,660,924 | B2* | 2/2014 | Hoch | G06N 3/006 |
| | | | | 705/35 |

(Continued)

OTHER PUBLICATIONS

"Designing Agent-Based Electronic Employment Markets," by William R. Gates and Mark E. Nissen, Electronic Commerce Research, 1: 239-263 (2001) (Year: 2001).*

(Continued)

*Primary Examiner* — Anne M Georgalas
(74) *Attorney, Agent, or Firm* — Schwegman Lundberg & Woessner, P.A.

(57) ABSTRACT

A system and method for inferring service providers are provided. In example embodiments, member data of members of a social networking service is accessed. From the member data, it is inferred that a particular member among the members of the social networking service is a freelancer member. A service request that the freelancer member is capable of fulfilling is identified based on a service request skill associated with the service request and a freelancer skill of the freelancer member. An option for the freelancer member to fulfill the service request is presented on a user interface of a user device of the freelancer member.

20 Claims, 15 Drawing Sheets

(56) References Cited

U.S. PATENT DOCUMENTS

| | | | |
|---|---|---|---|
| 9,158,821 B1* | 10/2015 | Quisel | G06Q 30/08 |
| 9,324,109 B1 | 4/2016 | Joseph et al. | |
| 9,449,282 B2* | 9/2016 | Diaz | G06N 5/048 |
| 2006/0212359 A1* | 9/2006 | Hudgeon | G06Q 10/063 705/7.11 |
| 2011/0029620 A1* | 2/2011 | Bonforte | H04L 67/306 709/206 |
| 2014/0136262 A1* | 5/2014 | Uzzaman | G06Q 10/06311 705/7.19 |
| 2014/0136443 A1 | 5/2014 | Kinsey et al. | |
| 2014/0149206 A1 | 5/2014 | Dubey et al. | |
| 2014/0164024 A1* | 6/2014 | Scone | G06Q 40/08 705/4 |
| 2014/0172412 A1 | 6/2014 | Viegas et al. | |
| 2016/0035039 A1* | 2/2016 | Singh | G06Q 40/08 705/4 |
| 2016/0335603 A1 | 11/2016 | Davar et al. | |

OTHER PUBLICATIONS

"Free @ Last—Thanks to the internet and online job services, thousands of service professionals are jumping to become free agents," by TC Doyle and Jan Stafford, VARbusiness: 25, United Business Media LLC (Feb. 7, 2000) (Year: 2000).*

"Applicant Initiated Interview Summary Issued in U.S. Appl. No. 15/048,813", dated Oct. 15, 2018, 3 Pages.

"Non Final Office Action Issued in U.S. Appl. No. 15/048,813", dated Jul. 25, 2018, 24 Pages.

"Response to Non-Final Office Action for U.S. Appl. No. 15/048,813", dated Oct. 16, 2018, 12 Pages.

"Applicant Initiated Interview Summary Issued in U.S. Appl. No. 15/048,813", dated Mar. 28, 2019, 33 Pages.

"Final Office Action Issued in U.S. Appl. No. 15/048,813", dated Feb. 8, 2019, 37 Pages.

"Non Final Office Action Issued in U.S. Appl. No. 15/048,813", dated Sep. 26, 2019, 22 Pages.

* cited by examiner

GRAPHIC DESIGNER FREELANCERS

FREELANCERS AVAILABLE IN YOUR PRICE RANGE
AND THAT MEET YOUR EXPERTISE NEEDS

[FILTER]

SPONSORED SERVICE PROVIDERS

JOHN SMITH (1ST)
SR. GRAPHIC DESIGNER
PALO ALTO, CA | INTERNET

| CURRENT: | FREELANCER |
| PAST: | MICROSOFT |
| EDUCATION: | U OF MICHIGAN |
| PRICE: | $25 PER HOUR |

RANKED SERVICE PROVIDERS

FRED FLIN
GRAPHIC DESIGNER
SAN JOSE, CA | INTERNET

| CURRENT: | GAMES R GREAT |
| PAST: | ACME PRODUCTS |
| EDUCATION: | UTC COMMUNITY |
| PRICE: | $200 FIXED FEE |

SALLY ALLEN
ILLUSTRATOR
SAN MATEO, CA | INTERNET

| CURRENT: | FREELANCER |
| PAST: | ACME PRODUCTS |
| EDUCATION: | HARVARD |
| PRICE: | $45 PER HOUR |

⋮

ERIC TROTZKY
GRAPHIC DESIGNER
SAN MATEO, CA | INTERNET

| CURRENT: | ZYNGA |
| PAST: | GOOGLE |
| EDUCATION: | YALE |
| PRICE: | $20 PER HOUR |

*FIG. 13*

INFERRING SERVICE PROVIDERS

TECHNICAL FIELD

Embodiments of the present disclosure relate generally to data processing systems and, more particularly, but not by way of limitation, to inferring service opportunities associated with a social networking service.

BACKGROUND

Service opportunities are created when service needs and talent to fulfill the service needs are identified. However, such opportunities can be lost when either the service needs go unrecognized or when the talent to fulfill the service needs cannot be found. Social networking services maintain massive scale datasets that include a variety of signals that can indicate many different aspects associated with members. Capturing service opportunities based on these signals in such massive scale datasets presents a number of challenges.

BRIEF DESCRIPTION OF THE DRAWINGS

Various ones of the appended drawings merely illustrate example embodiments of the present disclosure and cannot be considered as limiting its scope.

FIG. 13 is a user interface diagram depicting an example user interface that includes a ranked listing of service providers, according to some example embodiments.

DETAILED DESCRIPTION

Figure 1:
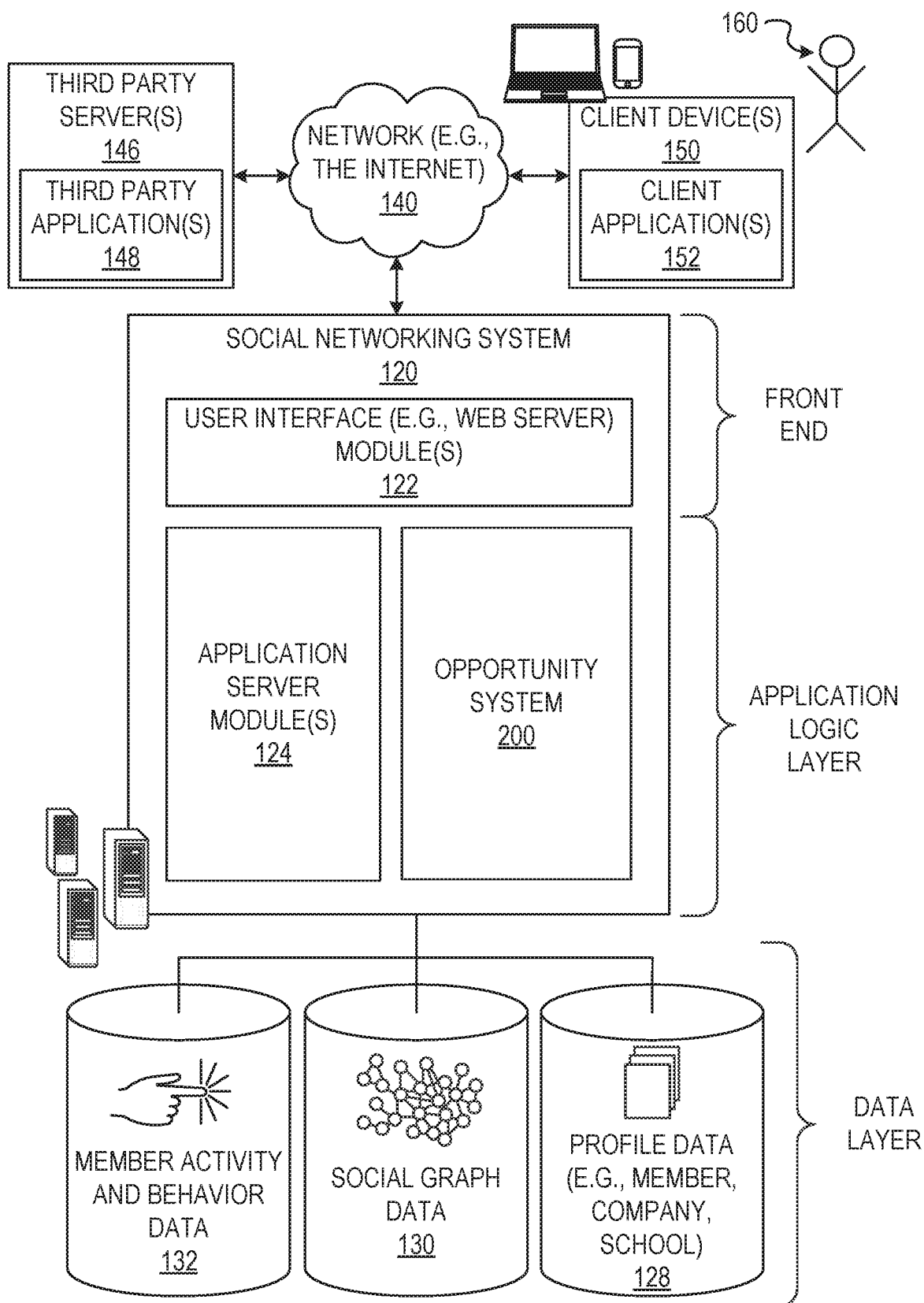
FIG. 1 is a network diagram depicting a client-server system within which various example embodiments may be deployed.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a server system detects a member event associated with a particular member of a social networking service. For example, the member event can comprise joining a group, adding a new skill to the member's profile, changing jobs, and so on. In response to detecting the member event, the server system infers a service request for a particular service based on the member event. For example, the server system may infer that the particular member may be in need of a real estate professional based on an update to a job location of the particular member on the social networking service. The server system then identifies provider members of the social networking service. The provider members are members of the social networking service that have a capability of fulfilling the inferred service request. In continuing with the above example, the server system identifies real estate professionals that can provide a service to the particular member. The server system calculates a match score for each of the identified provider members (e.g., based on how close the real estate professional is to the particular member, based on a skill set or skill level of the real estate professional, and so forth). The match score is indicative of a level of the capability of the corresponding provider of fulfilling the inferred service request. The server system then ranks the identified provider members according to the match score and presents at least a portion of the ranked identified provider members on a user interface of a user device of the particular member.

In further example embodiments, the server system accesses member data of members of a social networking service. The server system infers, from the member data, that a particular member among the members of the social networking service is a freelancer member capable of fulfilling a particular service request (e.g., a person that can fulfill a one-time or non-fulltime job task). For example, the server system infers a particular member is a freelancer member based on a similarity between the particular member profile and another member profile that is a freelancer. In various embodiments, the server system employs machine learning techniques to infer members that are freelancer members. Subsequently, the server system identifies a service request that the freelancer member is capable of fulfilling based on a service request skill associated with the service request and a freelancer skill of the freelancer member and presents an option for the freelancer member to fulfill the service request on a user interface of a user device of the freelancer member.

As shown in FIG. 1, a social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include an opportunity system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
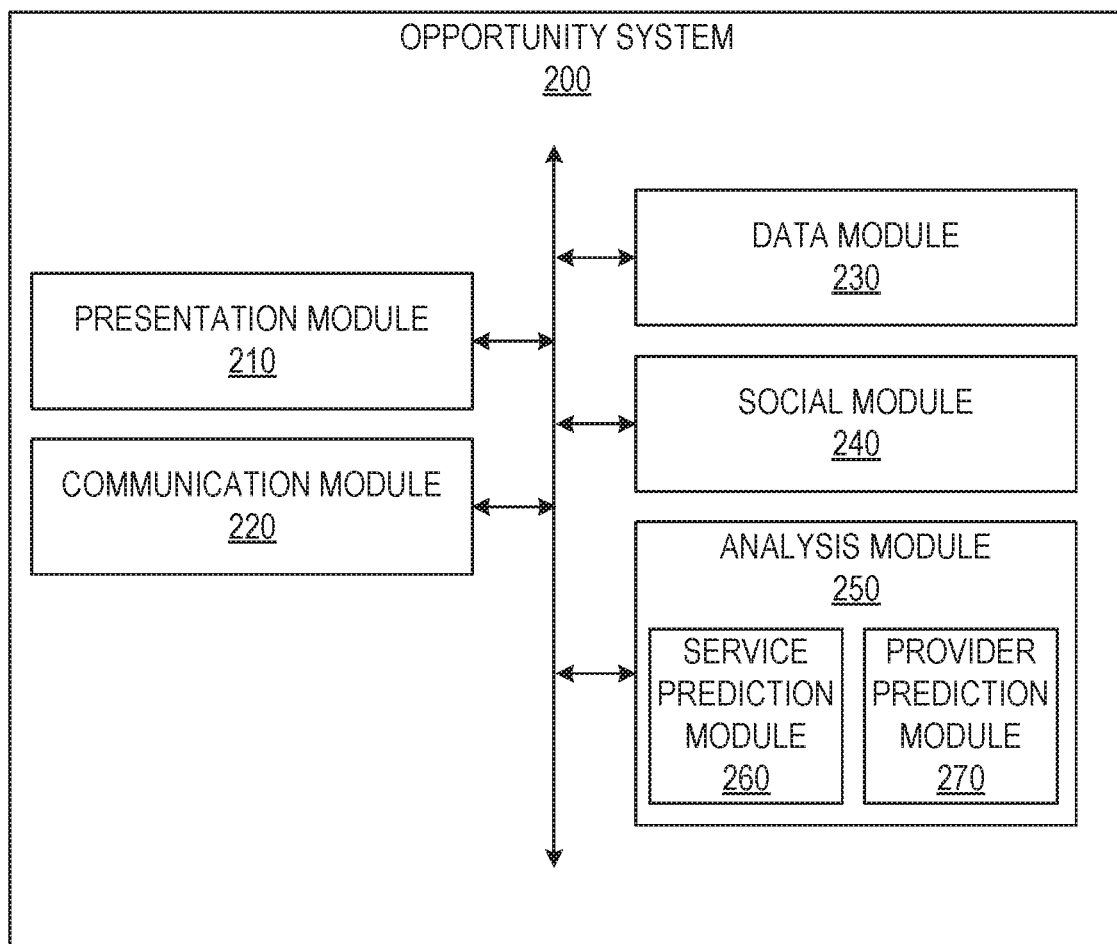
FIG. 2 is a block diagram illustrating an example embodiment of an opportunity system, according to some example embodiments.

FIG. 2 is a block diagram of the opportunity system 200 that provides functionality to infer service opportunities, identify freelancer members, and facilitate fulfillment of service opportunities. In an example embodiment, the opportunity system 200 includes a presentation module 210, a communication module 220, a data module 230, a social module 240, and an analysis module 250 including a service prediction module 260 and a provider prediction module 270. All, or some, of the modules 210-270 of FIG. 2, communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

In some implementations, the presentation module 210 provides various presentation and user interface functionality operable to interactively present (or cause presentation) and receive information from the user. In various example embodiments, the presentation module 210 functions in conjunction with the user interface module 122 of FIG. 1. For instance, the presentation module 210 can cause presentation of a ranked list of provider members including provider member information such as availability, geolocation, pricing data, and so forth. In various implementations, the presentation module 210 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors). It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the social networking system 120, the client devices 150, and the third party server(s) 146. In various example embodiments, the network communication can operate over wired or wireless modalities. Web services are intended to include retrieving information from the third party server(s) 146, the database(s) 128-132, and the application server module(s) 124. In some implementations, information retrieved by the communication module 220 comprises data associated with the user (e.g., user profile information from an online account, social networking service data associated with the user), or other data to facilitate the functionality described herein.

The data module 230 provides functionality to access data from many different sources including member data stored in databases 128, 130, and 132, the third party server(s) 146, and other sources. The member data includes, for example, social graph data, profile data, and member activity and behavior data, as described in connection with FIG. 1. For example, the data module 230 accesses member data (e.g., member data stored in databases 128, 130, and 132) associated with a particular member of the social networking service by a lookup or a search of the particular member using a member identifier. In some example embodiments, the data module 230 exchanges information with third party server(s) 146, client device(s) 150, or other sources of information.

The social module 240 provides various social media functionality. For example, the social module 240 performs lookups of members of a social networking service using member identifiers. The social module 240 works in conjunction with the other modules to identify various members of the social networking service based on various criteria. For instance, the social module 240 identifies members of the social networking service based on member identifiers, skills, geolocations, job titles, and so forth. In further embodiments, the social module 240 provides functionality to effectuate actions on the social networking service such as friending, posting, liking, profile updates, status updates, and so forth.

The analysis module 250 provides functionality to perform a variety of analyses to facilitate the functionality described herein. For example, the analysis module 250 analyzes the profile features, attributes, or characteristics extracted from the member data. In a specific non-limiting example, the analysis module 250 generates data structures for member profiles using profile features extracted from the member profiles. In this example, the analysis module 250 determines the profile similarity score between member profiles by comparing the generated data structures for respective member profiles.

The analysis module 250 also provides various functionality to perform predictive modeling using feature vectors. Examples of prediction models include a logistic regression model, a Naïve Bayes model, a support vector machines (SVM) model, a decision trees model, and a neural network model. For example, in some embodiments, a prediction model may be trained based on feature data (e.g., member profile data, social activity information, geolocation information, IP address login information, etc.) associated with a large plurality of members. More specifically, in an example, the training data is manually labeled as either a freelancer member or not a freelancer member or in the case of services, whether or not they need services. Once trained, the analysis module 250 may receive available features associated with a single, or multiple, particular member (e.g., member profile data, social activity information, geolocation information, IP address login information, etc.) in order to determine various probabilities or likelihoods such as a likelihood that a particular member is a freelancer member. In some example embodiments, an inferred freelancer member is prompted with a message to verify their status as a freelancer member. For instance, the presentation module 210 causes presentation of a message on a user interface of a client device of a candidate freelancer member asking the candidate freelancer member if they would like to perform a particular service, at a certain time and price, and whether they are a freelancer. In further example embodiments, the analysis module 250 uses the response to the prompt to further train the predictive model. That is to say, the analysis module 250 trains the predictive model with ground truth data including member profiles that are positively identified as freelancers and member profiles that are positively identified as non-freelancers (e.g., the predictive model is refined based on responses from candidate freelancer members such as false positive inference that inferred the member was a freelancer when the member was a non-freelancer and vise versa).

In various example embodiments, the analysis module 250 includes the service prediction module 260 and the provider prediction module 270. In some instances the functionality of these modules 260, 270 may be described as the functionality of the analysis module 250. The service prediction module 260 provides functionality to determine a likelihood that a particular member needs or may need a particular service (e.g., real estate services, tutoring services, laundering services, plumbing services, etc.). The provider prediction module 270 provides functionality to determine a likelihood that a particular member is a freelancer member (e.g., a freelance graphic designer that performs a number of short duration or one-time jobs). The service prediction module 260 and the provider prediction module 270 can employ machine learning techniques to determine such likelihoods using member data and activity as input feature vectors.

Figure 3:
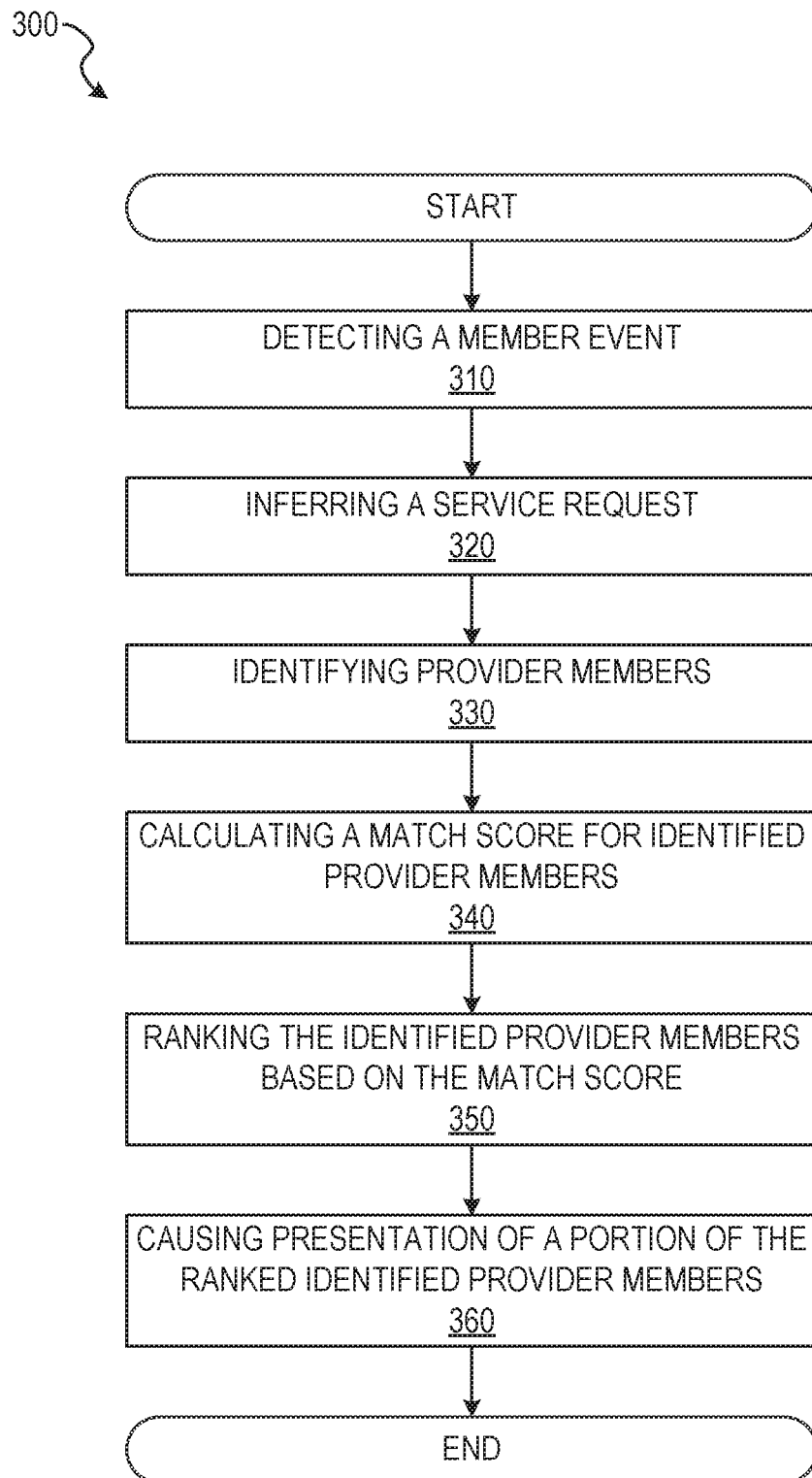
FIG. 3 is a flow diagram illustrating an example method for inferring service opportunities from member events on a social networking service, according to some example embodiments.

FIG. 3 is a flow diagram illustrating an example method 300 for inferring service opportunities from member events on a social networking service. The operations of the method 300 may be performed by components of the opportunity system 200, and are so described below for the purposes of illustration.

At operation 310, the communication module 220 detects a member event associated with a particular member of the social networking service. For instance, the member event comprises a member profile change event including at least one of a job change event (e.g., updating or changing job title), a skill change event (e.g., adding a particular skill such as a programming skill), a connection change event (e.g., friending another member of the social networking service), another type of member profile update, or another type of member action. In some embodiments, the communication module 220 monitors for member events in real time or near real time. In other embodiments, the communication module 220 aggregates member events for analysis by the opportunity system 200 offline during an offline session. In some embodiments, the member events detected by the communication module 220 are among a predetermined list of event types.

At operation 320, the service prediction module 260, in response to detection of the member event, infers a service request for a particular service based on the member event. For example, a particular member event such as a job change may be highly indicative of a need for a particular service. For instance, a job change that indicates a relocation may indicate the requester member may presently need, or may need in the near future, a real estate professional to assist with the relocation. In various embodiments, the data module 230 accesses historical service data that indicates services other members of the social networking service have used along with member events of the other users. In these embodiments, the service prediction module 260 correlates the member events of other users with the services used by the other users to identify rules to predict what services may be needed or desired following a particular member event. As described in more detail below in connection with FIG. 4, the service prediction module 260 may also use member event sequences to infer a service request.

At operation 330, the social module 240 identifies provider members of the social networking service that have a capability of fulfilling the inferred service request. In some instances, the provider members explicitly indicated a capability of fulfilling the service, for example, by providing skills, an expertise level associated with the skills, an indication that the member is a freelancer, price, geolocation availability, time of day availability, number of hours available, past experience, desired future experience, and so forth. In other instances, the opportunity system 200 infers that certain members of the social networking service are freelancer members and have certain skills (discussed more in connection with FIG. 8 below).

In an example embodiment, the social module 240 identifies candidate provider members that have a skill corresponding to the capability of fulfilling the service request (e.g., matching, or nearly matching, a skill of a candidate provider member with a skill associated with the service request). In some embodiments, the social module 240 or the analysis module 250 filters identified candidate provider members based on availability (e.g., geolocation availability or temporal availability), expertise level, a user-specified condition, or other criteria. In some embodiments the social module 240 may utilize a predetermined mapping that provides a list of skills for potential service requests.

At operation 340, the analysis module 250 calculates a match score for each of the identified provider members. In various example embodiments, the match score indicates a level of capability of fulfilling the inferred service request. For instance, the analysis module 250 infers a level of expertise corresponding to the inferred service request (e.g., inferred in a similar manner as that described above in connection with inferring the service request) and compares the level of expertise for the service request with a level of expertise of a candidate provider member to determine the match score. In other embodiments, the analysis module 250 compares various other characteristics of a candidate provider member and the inferred service request to determine the match score, such as price, availability, education level, reviews of the candidate service provider, and so forth. In various example embodiments, the match score is calculated based on a payment type for respective identified provider members. In these embodiments, the payment type comprises at least one of a fixed price, hourly price, or commission price. In further example embodiments, the match score is based at least in part on a geolocation of the particular member and respective geolocations of the identified provider members.

At operation 350, the analysis module 250 ranks the identified provider members according to the calculated match score. For example, the match score is indicative of a level of capability of fulfilling the inferred service request and the analysis module 250 orders the identified provider members with a highest match score first.

At operation 360, the presentation module 210 causes presentation of at least a portion of the ranked identified provider members on a user interface of a user device of the particular member. For instance, the presentation module 210 may present the top three identified provider members based on the match score.

Figure 4:
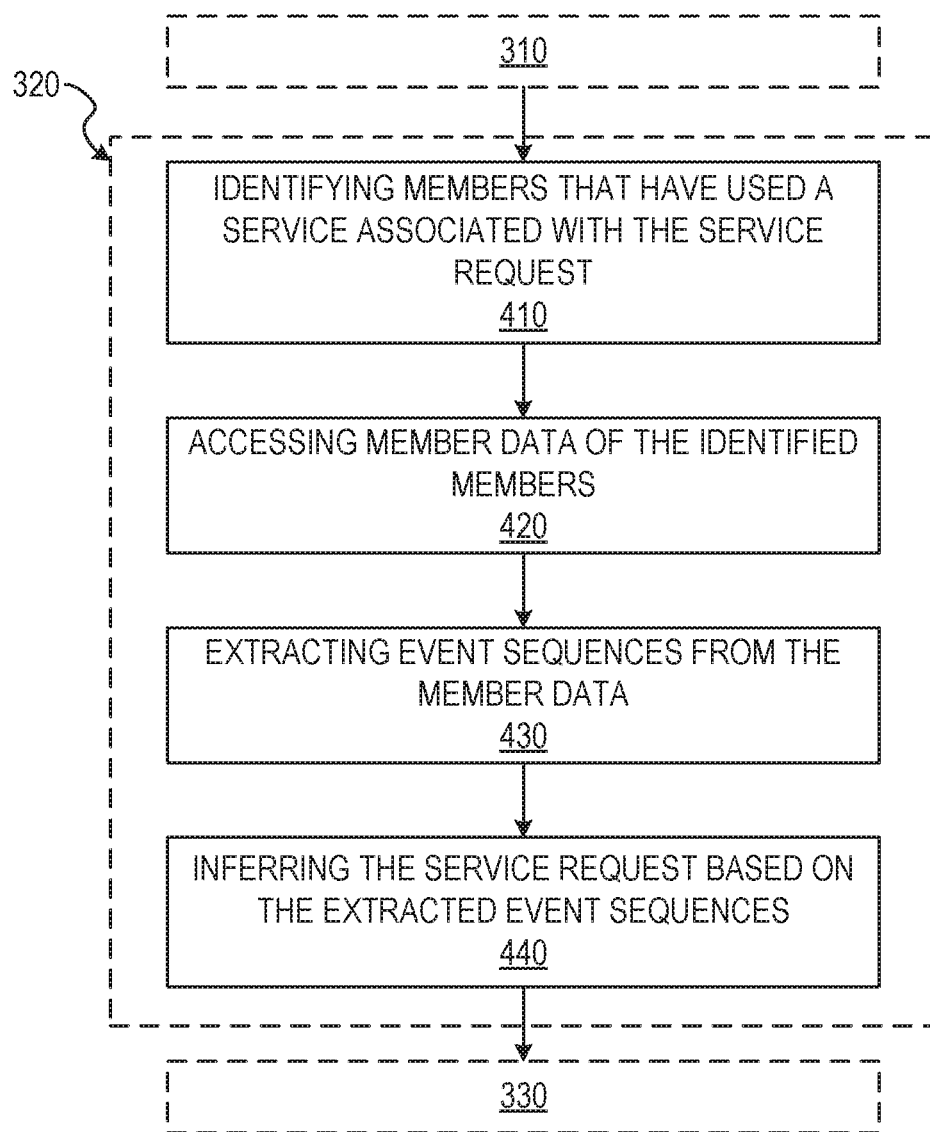
FIG. 4 is a flow diagram illustrating further example operations for identifying provider members as part of the method for inferring service opportunities, according to some example embodiments.

FIG. 4 is a flow diagram illustrating further example operations for identifying provider members as part of the method 300 for inferring service opportunities. Subsequent to the communication module 220 detecting the member event at operation 310, the service prediction module 260 infers the service request based on the detected member event at operation 320. In some embodiments, operation 320 includes the additional operations of FIG. 4.

At operation 410, the social module 240 or the data module 230 identifies from historical service data members of the social networking service that have used, or engaged with, the particular service. For example, the data module 230 accesses historical service data that indicates when a particular member used a service (e.g., a purchase history) or engaged with a service indicating an interest in using the service (e.g., a click on an advertisement for a service, an impression, page view, search for a service, and so on). In this example, the historic service data may also indicate a time (e.g., a timestamp) of when the particular member used, or engaged with, the particular service.

At operation 420, the social module 240 accesses member data of the identified members that have used the particular service. For instance, the member data indicates member events for the identified members along with a timestamp indicating a time when a particular member event occurred.

At operation 430, the analysis module 250 extracts, from the member data, an event sequence including events associated with the use of the particular service. For example, a particular example event sequence may comprise a profile update indicating graduation from an education program followed by an update in job title. Such a sequence may be highly indicative of a need or desire for a particular service, such as, for example, purchasing new clothing, getting professional pictures taken, or a real estate agent for relocation.

At operation 440, the service prediction module 260 infers the service request by comparing the extracted event sequence associated with an event sequence including the member event associated with the particular member. For example, if the communication module 220 detects a certain event sequence and the service prediction module 260 determines that the same event sequence is highly correlated with a particular service based on historical member events data and the historical service data, then the service prediction module 260 infers that the particular member may need or desire the particular service and generates an inferred service request to be fulfilled by a certain provider member.

Figure 5:
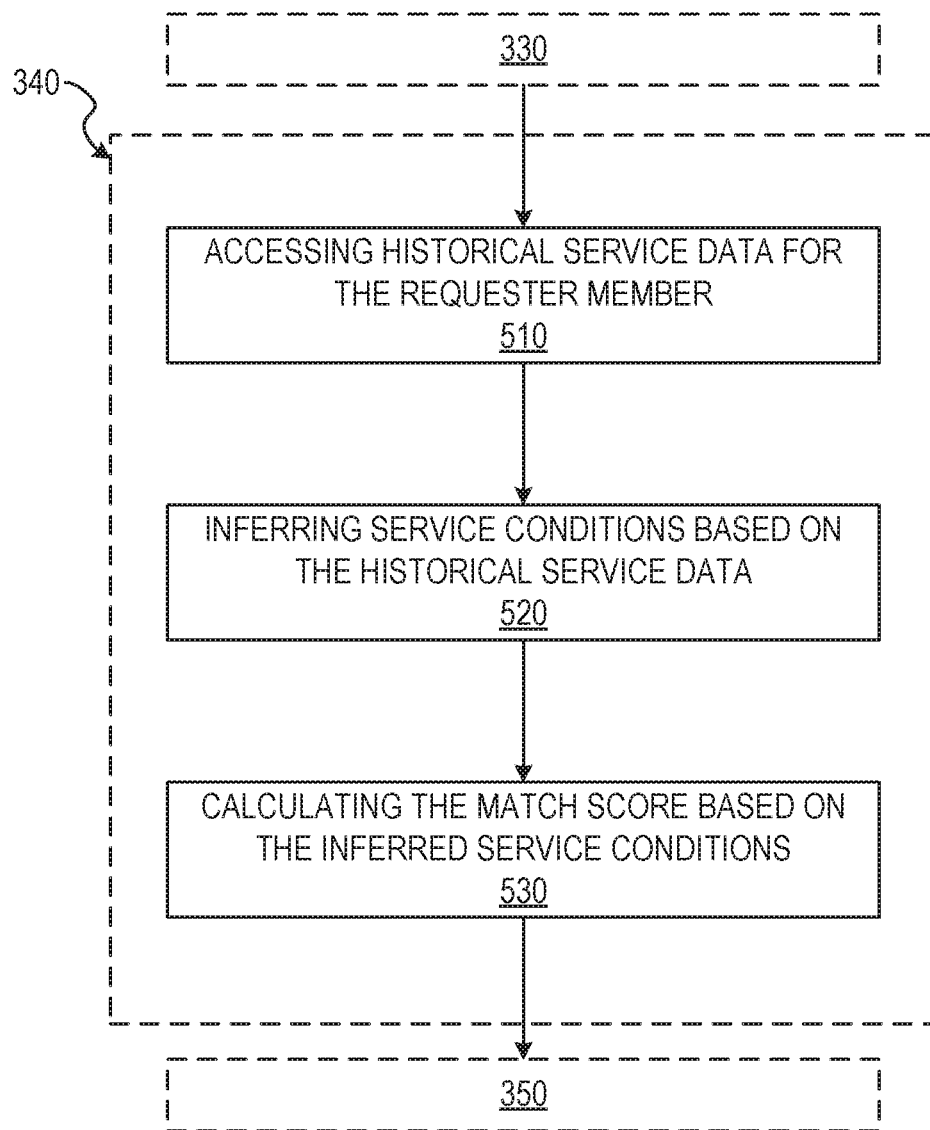
FIG. 5 is a flow diagram illustrating further example operations for calculating a match score as part of the method for inferring service opportunities, according to some example embodiments.

FIG. 5 is a flow diagram illustrating further example operations for calculating a match score as part of the method 300 for inferring service opportunities. Subsequent to the social module 240 identifying provider members at operation 330, the analysis module 250 calculates a match score for the identified provider members at operation 340. In some embodiments, operation 340 includes the additional operations of FIG. 5.

At operation 510, the data module 230 accesses historical service data for the particular member. For example, the historical service data may be a listing of services that the particular member has previously used or a listing of services that a member similar to the particular member has previously used.

At operation 520, the analysis module 250 infers service conditions based on the historical service data. In various example embodiments, the service conditions include at least one of a budget, time of day for service, or maximum service provider distance. For example, the analysis module 250 may infer service conditions based on historical service data of similar users of the particular member or the historical service data of the particular user (e.g., how much has the user or similar users paid for similar services in the past, how far away from their home are these users willing to employ a service, etc.).

At operation 530, the analysis module 250 calculates the match score based at least in part on the inferred service conditions for the particular member. For instance, the analysis module 250 may calculate a low match score for a provider member with a higher price than the inferred budget of the particular user as opposed to a provider member with a price within the inferred budget of the particular user. In another example, the analysis module 250 calculates a low or zero match score for a particular provider member that is outside of a geographic range for the particular member.

Figure 6:
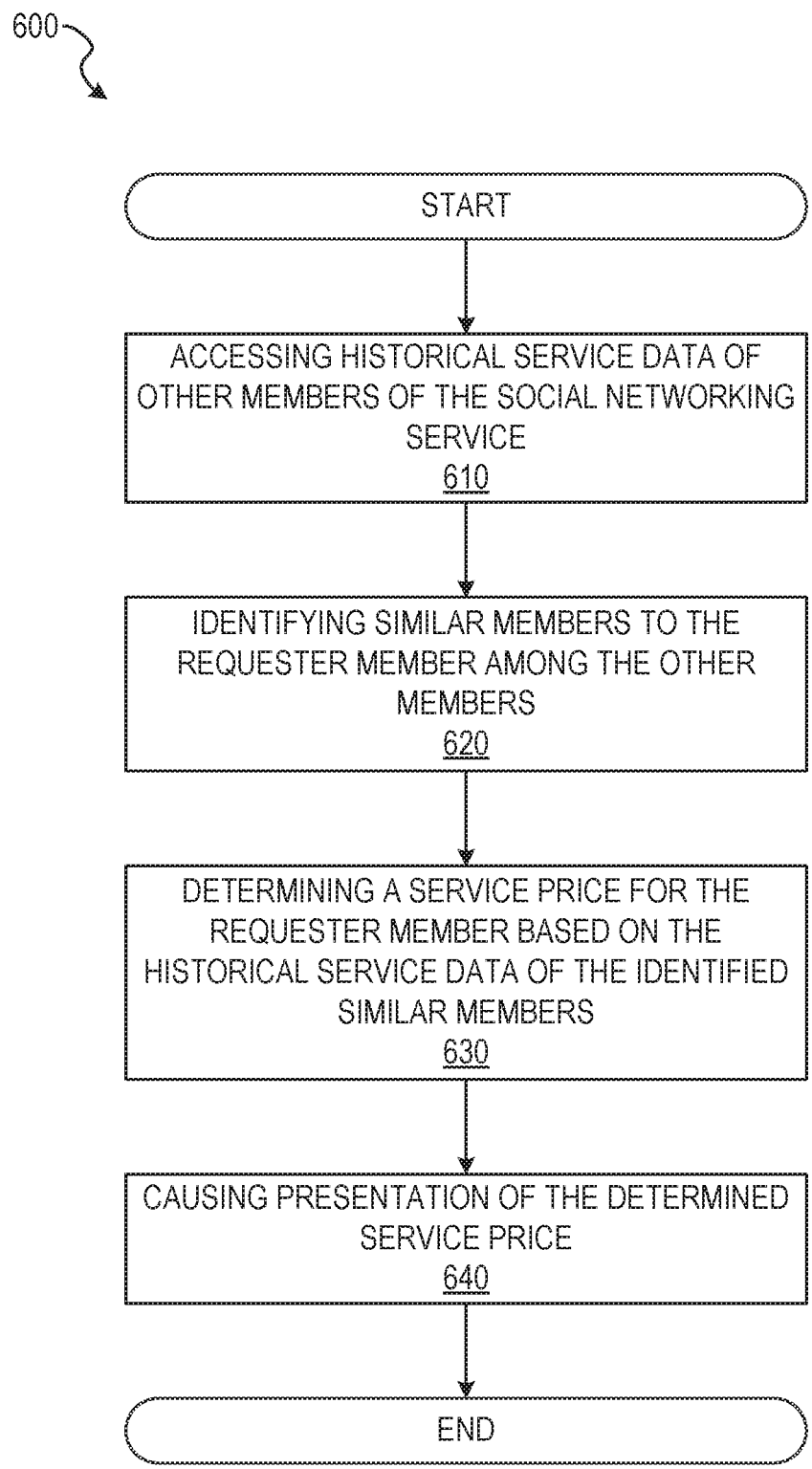
FIG. 6 is a flow diagram illustrating an example method for determining a service price for a particular inferred service request, according to some example embodiments.

FIG. 6 is a flow diagram illustrating an example method 600 for determining a service price for a particular inferred service request. The operations of the method 600 may be performed by components of the opportunity system 200, and are so described below for the purposes of illustration.

At operation 610, the data module 230 accesses historical service data of other members of the social networking service. In various example embodiments, the historical service data indicates a price paid for the particular service by the other members of the social networking service.

At operation 620, the social module 240 identifies similar members of the social networking service among the other members that are similar to the particular member by comparing profile data of the particular member with profile data of a candidate similar member. For example, the social module 240 identifies similar members to the particular member based on demographic information (e.g., age, gender, etc.), employment data (e.g., same or similar profession), geolocation, and so on.

At operation 630, the analysis module 250 determines a service price for the particular member based on the price paid corresponding to the identified similar member. For example, the analysis module 250 averages service prices paid by similar members to determine the service price for the particular member or uses a service price corresponding to a most similar member to the particular member. The analysis module 250 can also take into account an expertise level, geolocation (e.g., services are more expensive in large cities), time of day (higher price for after hours service), and other information to determine the service price.

At operation 640, the presentation module 210 causes presentation of the determined service price, or a range of determined service prices, on the user interface of the user device of the particular member. For example, the presentation module 210 suggests or recommends the determined service price to the particular member as being a price that the particular member should pay for the inferred service request.

Figure 7:
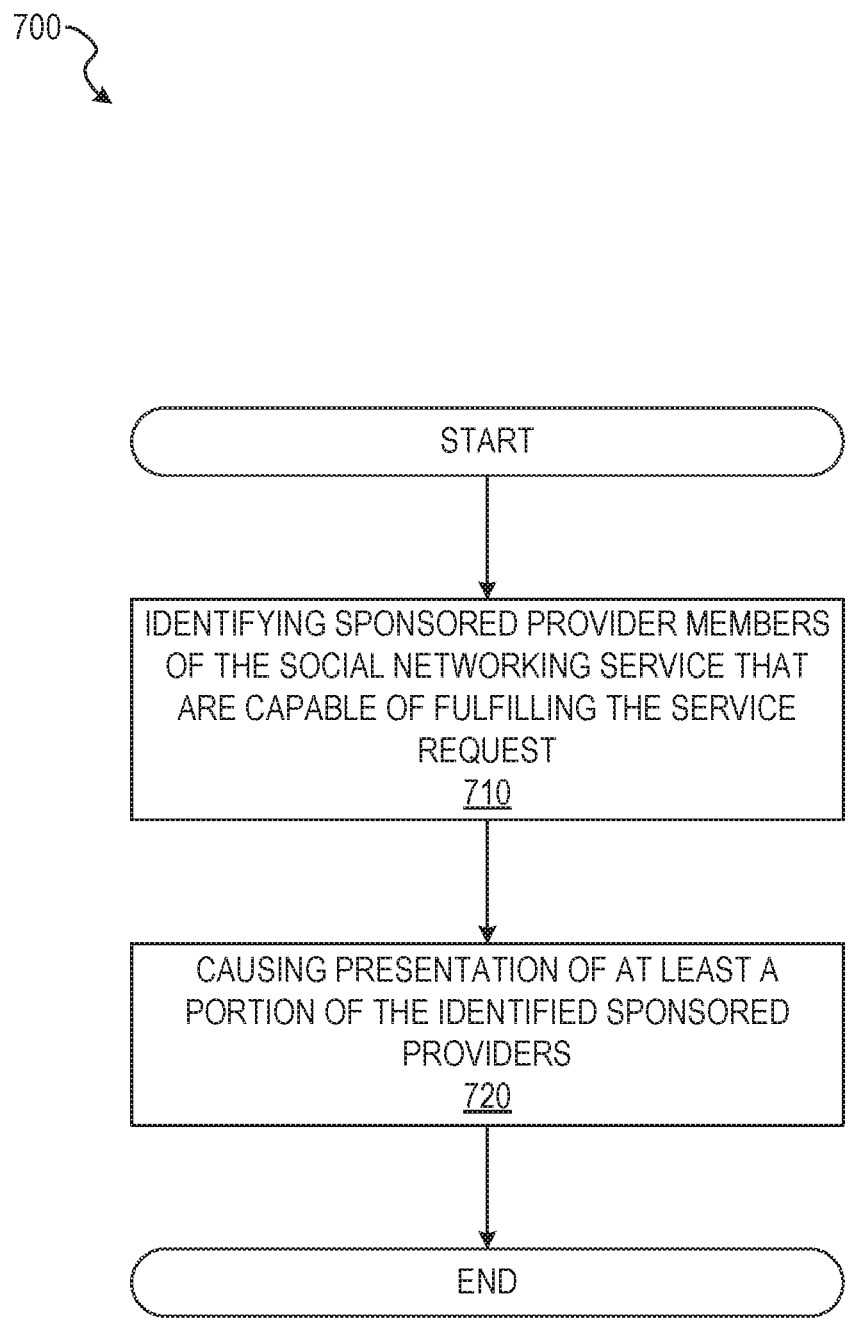
FIG. 7 is a flow diagram illustrating an example method for identifying sponsored provider members, according to some example embodiments.

FIG. 7 is a flow diagram illustrating an example method 700 for identifying sponsored provider members. The operations of the method 700 may be performed by components of the opportunity system 200, and are so described below for the purposes of illustration.

At operation 710, the social module 240 identifies sponsored provider members of the social networking service. In various example embodiments, the sponsored provider members have paid a sponsor fee for the designation of sponsored provider. The opportunity system 200 identifies sponsored provider members in a manner similar to that described above in connection with FIG. 3, but the sponsored provider members are in a pool of members separate from the non-sponsored provider members. That is to say, the analysis module 250 ranks the identified sponsored provider members separately form the non-sponsored provider members so that the sponsored provider members are competing with other sponsored provider members for a higher rank.

At operation 720, similar to the operation 360 described above, the presentation module 210 causes presentation of at least a portion of the identified sponsored provider members on the user interface of the user device of the particular member. In various example embodiments, the presentation module 210 causes presentation of the identified sponsored provider members along with the identified provider members on the user interface of the user device of the particular member. That is to say, in an example embodiment, the presentation module 210 causes presentation of both sponsored provider members and non-sponsored provider members.

Figure 8:
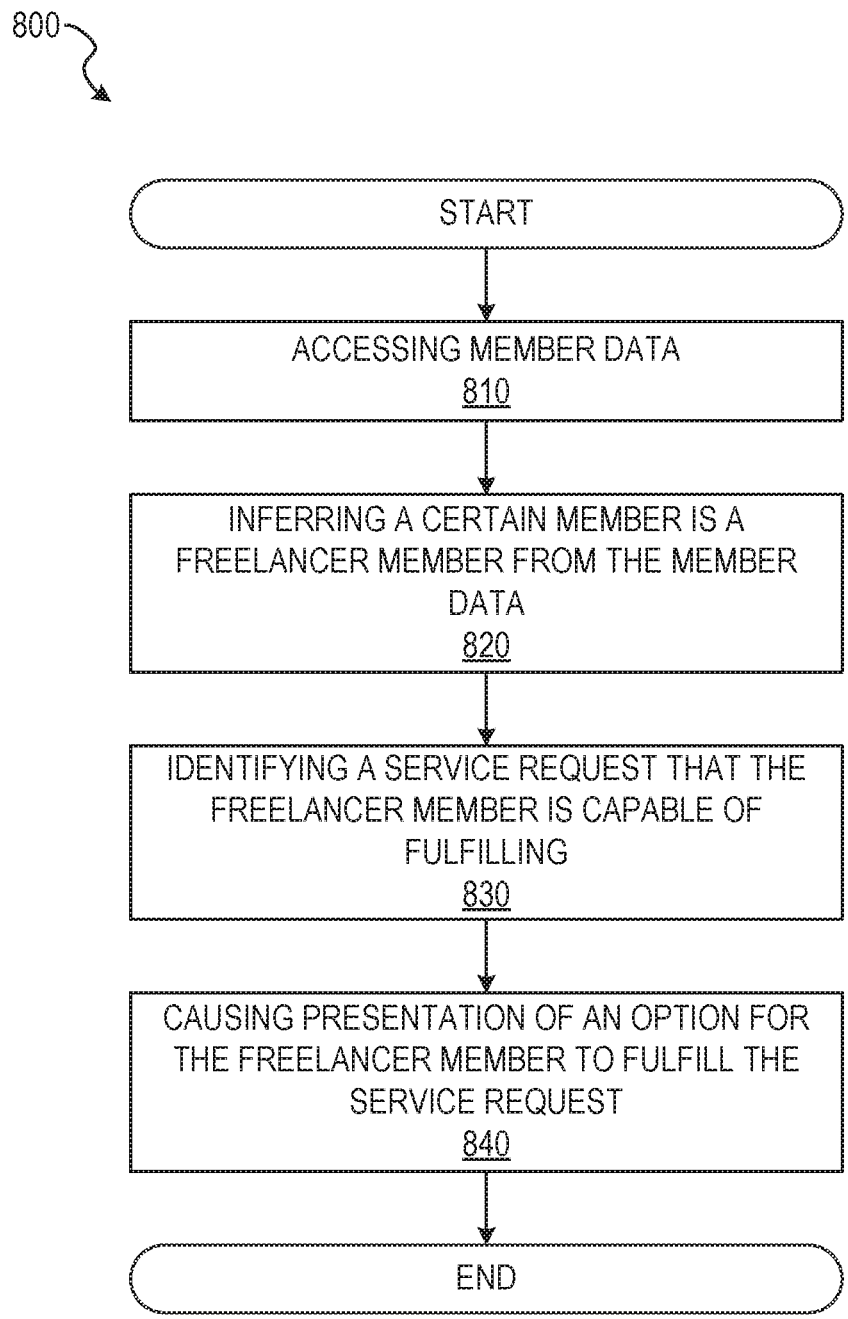
FIG. 8 is a flow diagram illustrating an example method for inferring service providers, according to some example embodiments.

FIG. 8 is a flow diagram illustrating an example method 800 for inferring service providers. The operations of the method 800 may be performed by components of the opportunity system 200, and are so described below for the purposes of illustration.

At operation 810, the social module 240 accesses member data of members of a social networking service. For example, the social module 240 accesses member data for a filtered group of members such as those members within a certain geographic area, or that have certain skills, have attained a certain education level, have a certain job title in their job history, and so forth. In various example embodiments, the member data comprises at least one of a job history or an education history.

At operation 820, the provider prediction module 270 infers, from the member data, that a particular member among the members of the social networking service is a freelancer member capable of fulfilling a particular service request. For example, the provider prediction module 270 inputs features (e.g., profile data such as job history, education history, connections, login history, skills, and so on) into a prediction model to predict that the member is both a freelancer member and is capable of fulfilling the particular service request. In further example embodiments, the analysis module 250 infers a skill level for the freelancer skill based on the member data. In these example embodiments, the skill level is associated with the capability of fulfilling the particular service request.

At operation 830, the analysis module 250 identifies a service request that the freelancer member is capable of fulfilling based on a service request skill associated with the service request and a freelancer skill of the freelancer member. For instance, the data module 230 accesses a listing of available service requests and the analysis module 250 scores each of the available service requests based on a comparison of skills, expertise level, freelancer specified conditions (e.g., a time of day available), and so forth between the freelancer member and the available service request. In various example embodiments, the service request is identified based at least in part on a geolocation of the freelancer member and a geolocation associated with the service request.

At operation 840, the presentation module 210 causes presentation of an option for the freelancer member to fulfill the service request on a user interface of a user device of the freelancer member. In some embodiments, when the freelancer member selects the option, the opportunity system 200 facilitates the freelancer member initiating performance of the service request (e.g., communicates a message to the service requester member that the freelancer member can complete the service request).

Figure 9:
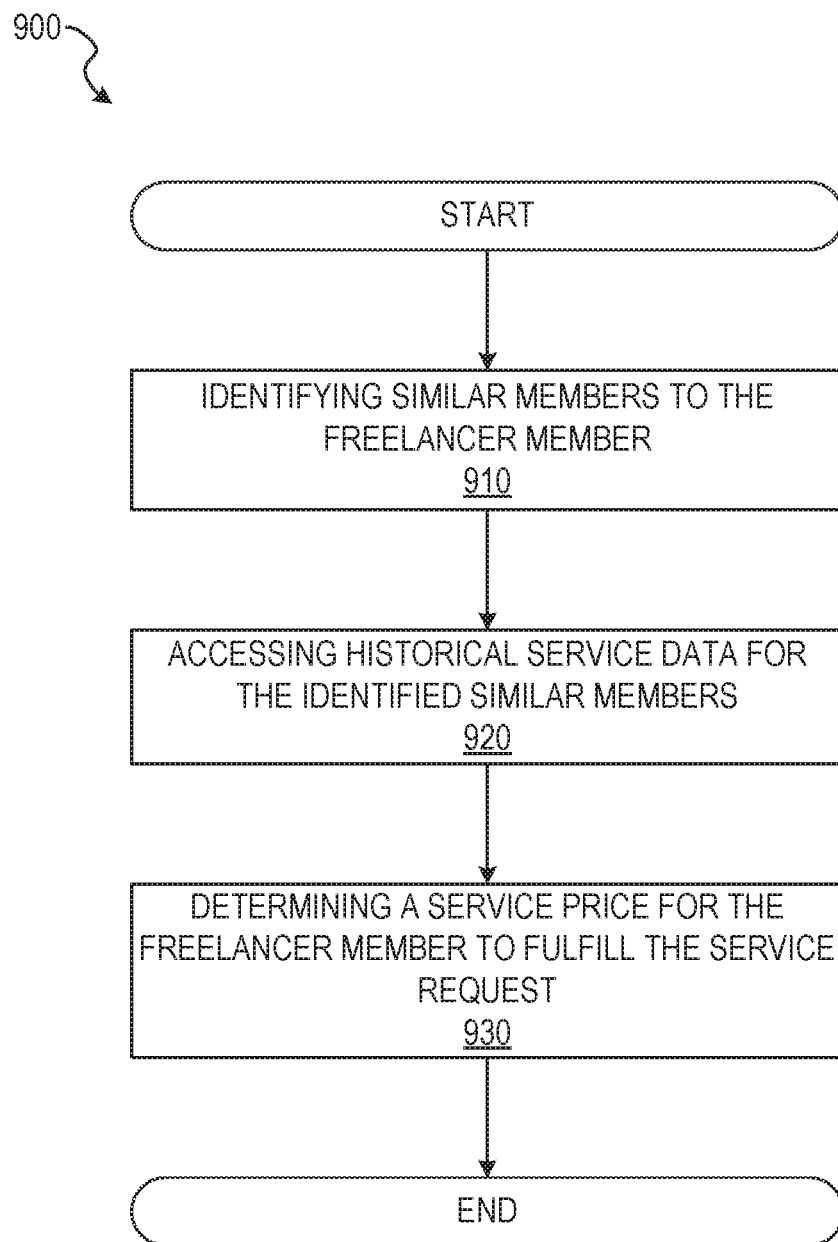
FIG. 9 is a flow diagram illustrating an example method for determining a service price for an identified freelancer member, according to some example embodiments.

FIG. 9 is a flow diagram illustrating an example method 900 for determining a service price for an identified freelancer member. The operations of the method 900 may be performed by components of the opportunity system 200, and are so described below for the purposes of illustration.

At operation 910, the social module 240 identifies similar members of the social networking service with a skill that is similar to the freelancer skill. In further example embodiments, the social module 240 identifies similar members of the social networking service among the other members that are similar to the freelancer member by comparing profile data of the freelancer member with profile data of a candidate similar member. For example, the social module 240 identifies similar members to the freelancer member based on demographic information (e.g., age, gender, etc.), employment data (e.g., same or similar profession), geolocation, and so on. In various example embodiments, the similar members of the social networking service include contact members of the freelancer member that have a relationship with the freelancer member on the social networking service.

At operation 920, the data module 230 accesses historical service data for the identified similar members. In various example embodiments, the historical service data indicates a price paid for the particular service by the other members of the social networking service.

At operation 930, the analysis module 250 determines a service price for fulfilling the service request based on historical service data for the identified similar members. For example, the analysis module 250 averages service prices paid by similar members to determine the service price for the freelancer member or uses a service price corresponding to a most similar member to the freelancer member. The analysis module 250 can also take into account other factors such as an expertise level, geolocation (e.g., services are more expensive in large cities), time of day (higher price for after-hours service), and other information to determine the service price.

Figure 10:
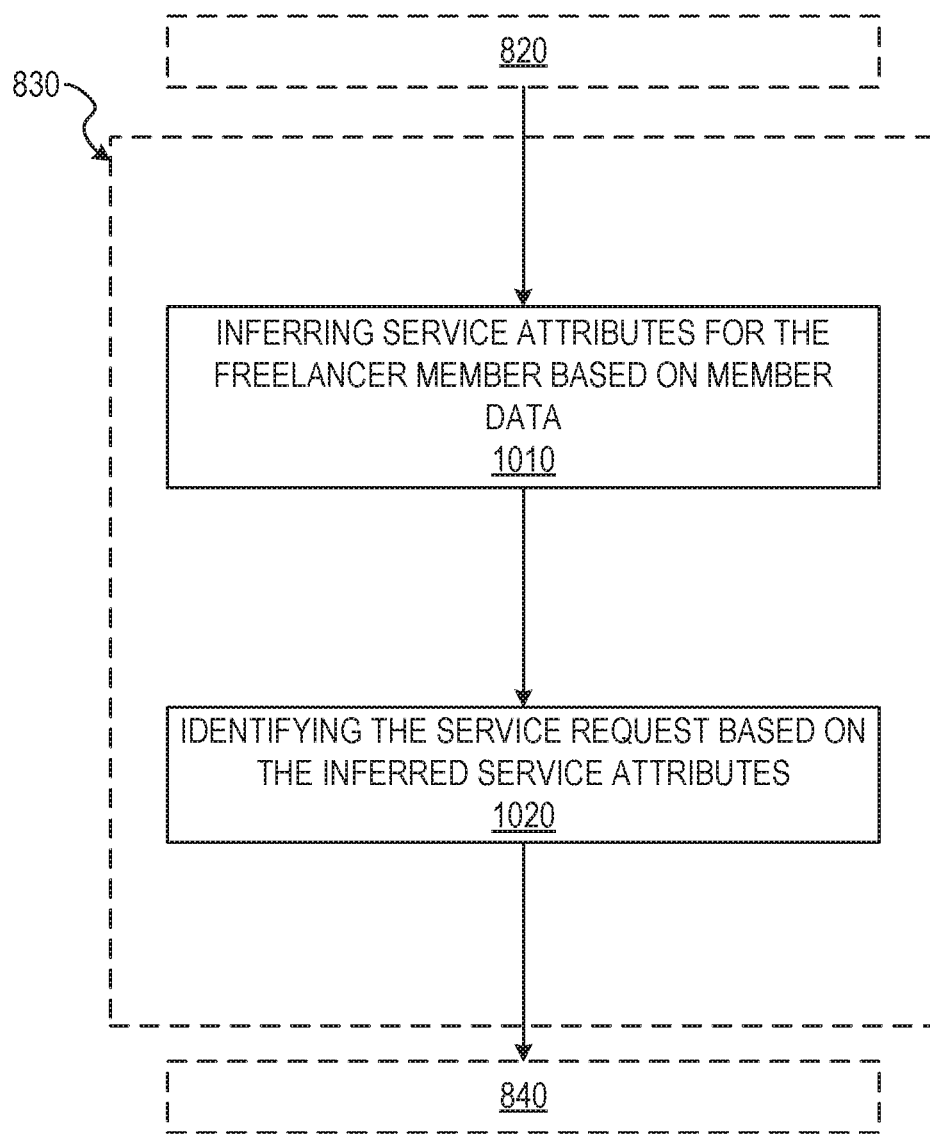
FIG. 10 is a flow diagram illustrating further example operations for identifying a service request for the freelancer members as part of the method for inferring service providers, according to some example embodiments.

FIG. 10 is a flow diagram illustrating further example operations for identifying a service request for the freelancer members as part of the method 800 for inferring service providers. Subsequent to the provider prediction module 270 inferring a particular member is a freelancer member from the member data at operation 820, the analysis module 250 identifies a service request that the freelancer member is capable of fulfilling at operation 830. In some embodiments, operation 830 includes the additional operations of FIG. 10.

At operation 1010, the analysis module 250 infers service attributes for the freelancer member based on the member data. In various example embodiments, the service attributes include at least one of a geolocation availability or a time availability.

At operation 1020, the analysis module 250 identifies the service request based at least in part on the inferred service attributes. For example, the analysis module 250 filters out service requests that correspond to a geolocation outside of a maximum distance from a freelancer member geolocation. In this way, the analysis module 250 identifies more relevant service requests personalized for the freelancer member.

Figure 11:
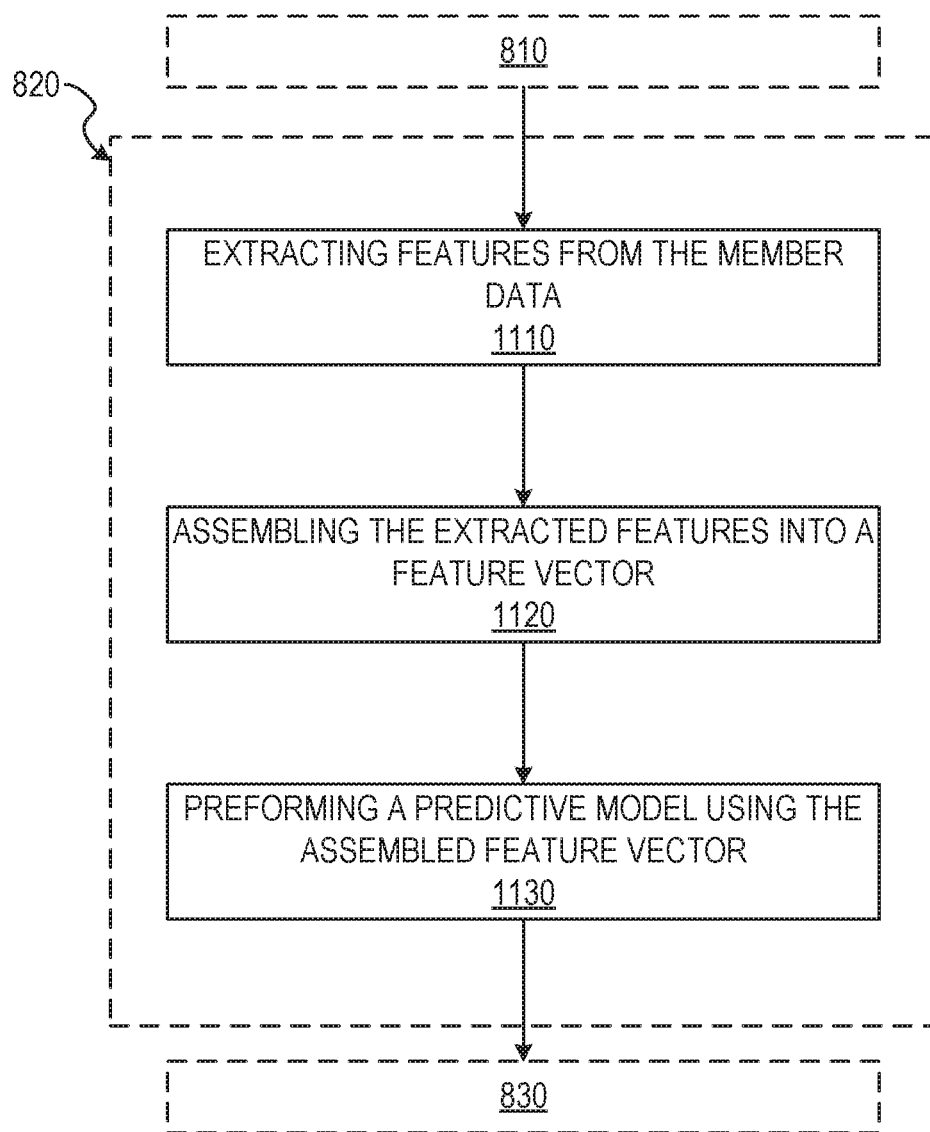
FIG. 11 is a flow diagram illustrating further example operations for the method for inferring service providers, according to some example embodiments.
Figure 12:
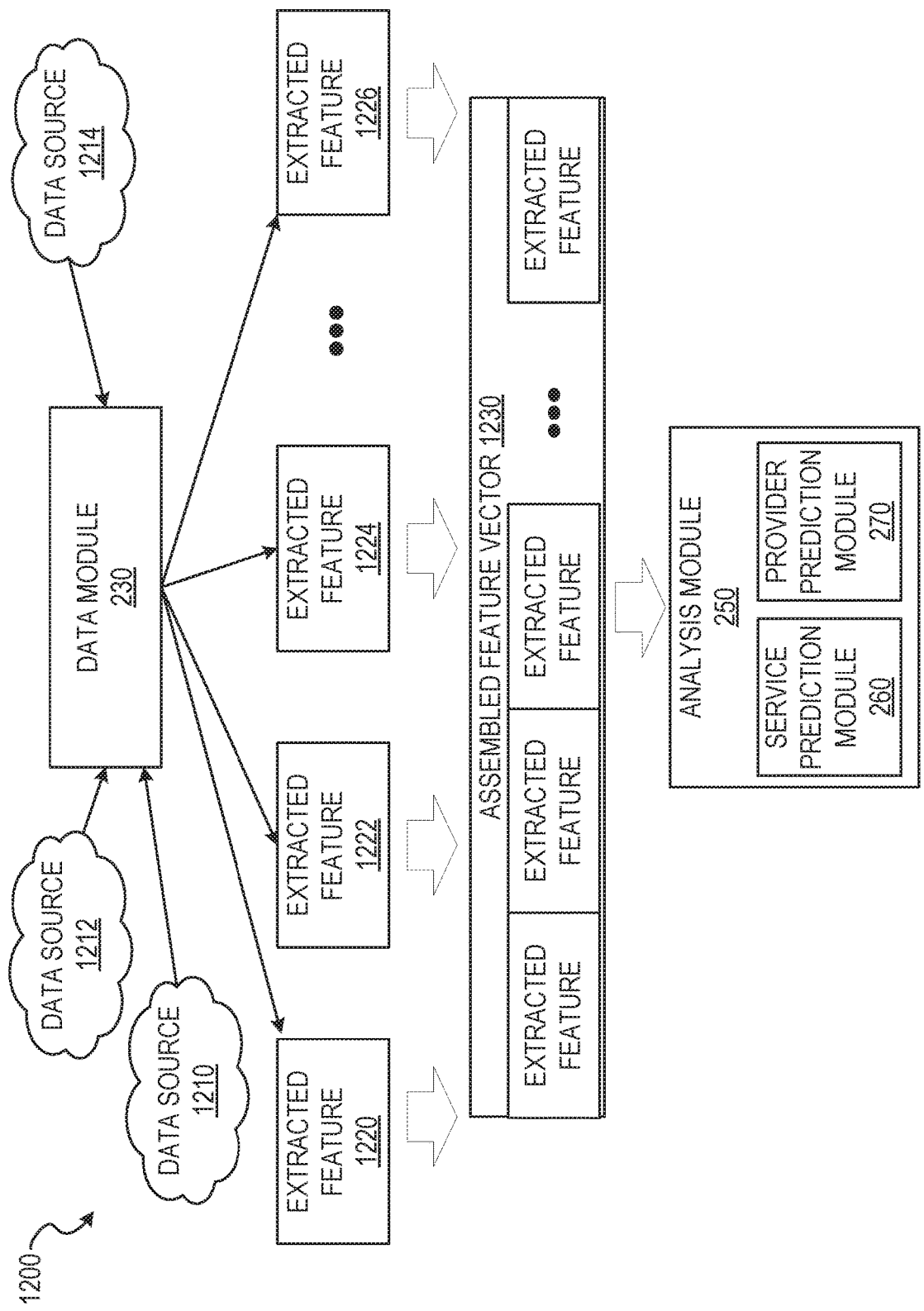
FIG. 12 is a diagram illustrating an example data flow, according to some example embodiments.

FIG. 11 is a flow diagram illustrating further example operations for the method 800 for inferring service providers. Subsequent to the social module 240 accessing the member data at operation 810, the provider prediction module 270 infers a particular member is a freelancer member from the member data at operation 820. In some embodiments, operation 820 includes the additional operations of FIG. 11. It will be appreciated that the techniques described in FIGS. 11 and 12 can be employed in the discussion above to perform a wide variety of predictions (e.g., machine-learning-based skills prediction, service price prediction, and so on).

At operation 1110, the provider prediction module 270 extracts features from the member data of the particular member of the social networking service. For example, if the member data includes job history data, then the provider prediction module 270 or the analysis module 250 extracts job titles, descriptions, companies, start date, end date, and so from the job history data.

At operation 1120, the provider prediction module 270 assembles the extracted features into a feature vector. For instance, the provider prediction module 270 or the analysis module 250 creates a feature vector from certain extracted features (e.g., administrator-specified features).

At operation 1130, the provider prediction module 270 performs a predictive model based on the assembled feature vector to infer the particular member is capable of fulfilling the particular service request. In various example embodiments, the prediction model is any one of a logistic regression model, a Naïve Bayes model, a support vector machines (SVM) model, a decision trees model, and a neural network model.

To help illustrate the concepts of FIG. 11 (and other predictive modeling described above), FIG. 12 is a diagram 1200 illustrating an example data flow. In an example embodiment, the data module 230 accesses data from a variety of data sources such as data sources 1210, 1212, and 1214 (e.g., member data from a social networking service). The analysis module 250 extracts features from source data such as extracted features 1220, 1222, 1224, and 1226 and assembles an assembled feature vector 1230 from the extracted features. Subsequently, the analysis module 250 (e.g., the service prediction module 260 or the provider prediction module 270) performs a predictive modeling on the assembled feature vector 1230 to predict a likelihood that a particular member is a freelancer, to predict a likelihood that a particular member is interested in a certain service, predict a skill level of a freelancer, and so on. For example, the analysis module 250 may apply a statistics-based machine learning model such as a logistic regression model to the assembled feature vector 1230. The analysis module 250 may use various other prediction modeling techniques to predict whether a particular member is a freelancer member among other predictions. For example, other prediction modeling techniques may include other machine learning models such as a Naïve Bayes model, a support vector machines (SVM) model, a decision trees model, a neural network model, and so forth.

FIG. 13 is a user interface diagram depicting an example user interface that includes a ranked service provider and a sponsored service provider. Although FIG. 13 depicts specific example user interfaces and user interface elements, these are merely non-limiting examples; many other alternate user interfaces and user interface elements can be generated by the presentation module 210 and caused to be presented to the user (e.g., the user 160). It will be noted that alternate presentations of the displays of FIG. 13 can include additional information, graphics, options, and so forth. Alternatively, other presentations can include less information, or provide abridged information for easy use by the user.

FIG. 13 depicts an example user interface 1300 that includes identified ranked provider members, such as provider member 1330, and a sponsored provider member 1320. The user interface 1300 also includes a user interface object 1310 that can be interacted with by the user to alter or modify the user interface 1300 (e.g., a button that when clicked by the user provides filtering options to filter the ranked list of provider members). The sponsored provider member 1320 and the provider member 1330 include various information about each provider member such as current job title, current employer, whether the member is a freelancers, past employment, education, expertise level (e.g., beginner, intermediate, expert, or certified), a price for service, geolocation range for service (e.g., within 50 miles of a specified city), hours of availability, days of availability, duration of project that the provider member can undertake, other provider member criteria (e.g., special equipment requirements such as a service requesting having a particular type of power tool for the provider member to use to complete the service request), and so forth.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-13 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 14:
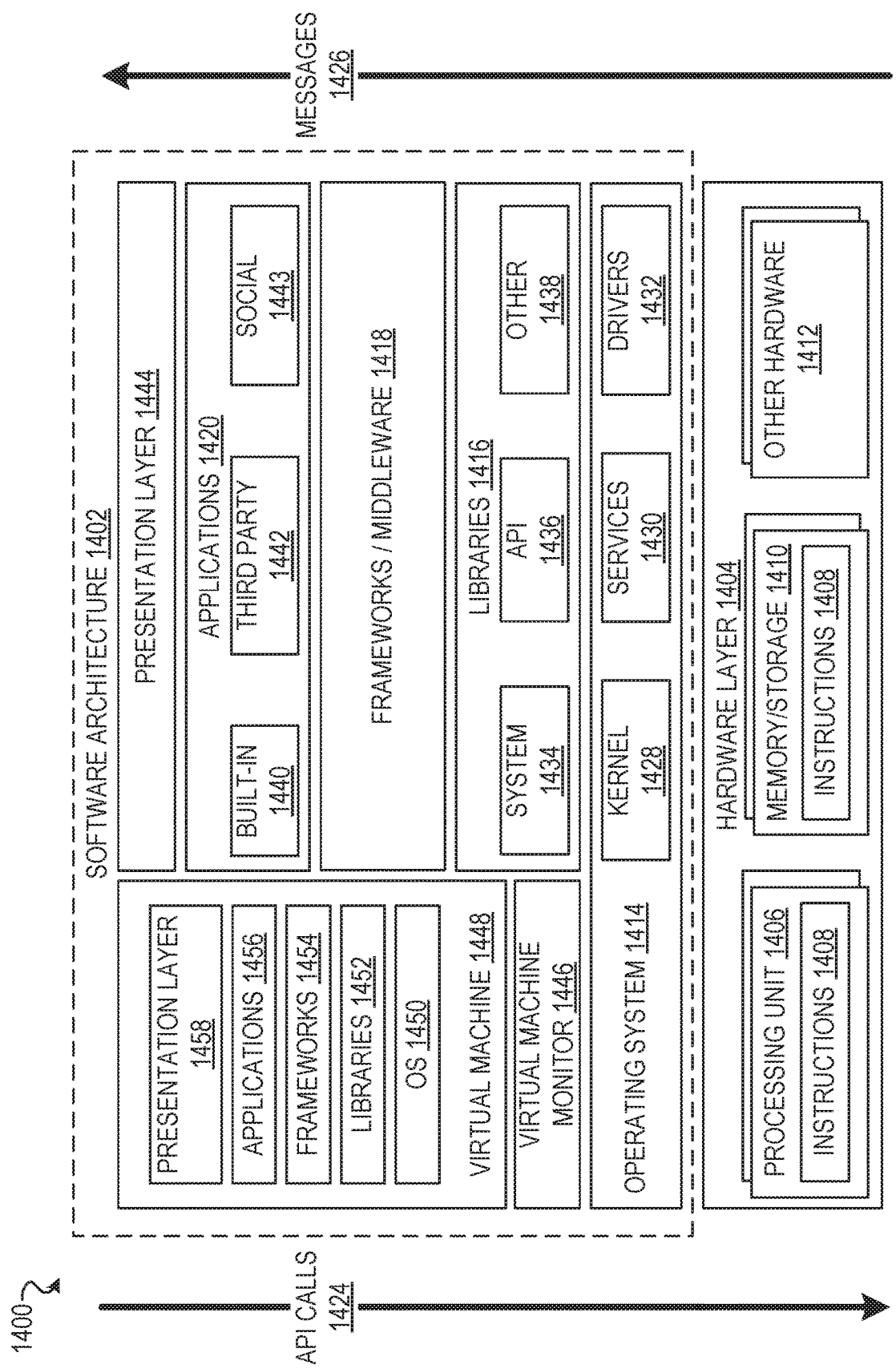
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture and it will be appreciated that many other architectures may be implemented to facilitate the functionality described herein. The software architecture 1402 may be executing on hardware such as machine 1500 of FIG. 15 that includes, among other things, processors 1510, memory/storage 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. Executable instructions 1408 represent the executable instructions of the software architecture 1402, including implementation of the methods, modules and so forth of FIGS. 1-13. Hardware layer 1404 also includes memory and storage modules 1410, which also have executable instructions 1408. Hardware layer 1404 may also comprise other hardware 1412, which represents any other hardware of the hardware layer 1404, such as the other hardware illustrated as part of machine 1500.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420 and presentation layer 1444. Operationally, the applications 1420 or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special purpose operating systems may not provide the frameworks/middleware 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration.

The libraries 1416 may provide a common infrastructure that may be utilized by the applications 1420 or other components or layers. The libraries 1416 typically provide functionality that allows other software modules to perform tasks in an easier fashion than to interface directly with the underlying operating system 1414 functionality (e.g., kernel 1428, services 1430 or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 (also sometimes referred to as middleware) may provide a higher-level common infrastructure that may be utilized by the applications 1420 or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 or other software components/modules, some of which may be specific to a particular operating system or platform.

The applications 1420 include built-in applications 1440 or third party applications 1442. Examples of representative built-in applications 1440 may include, but are not limited to, a contacts application, a browser application, a book reader application, a location application, a media application, a messaging application, or a game application. Third party applications 1442 may include any of the built-in applications 1440 as well as a broad assortment of other applications. In a specific example, the third party application 1442 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 1442 may invoke the API calls 1424 provided by the mobile operating system such as operating system 1414 to facilitate functionality described herein. In an example embodiment, the applications 1420 include a social application 1443 that includes the opportunity system 200, or a portion thereof, as part of the application.

The applications 1420 may utilize built-in operating system functions (e.g., kernel 1428, services 1430 or drivers 1432), libraries (e.g., system libraries 1434, API libraries 1436, and other libraries 1438), frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine 1500 of FIG. 15, for example). The virtual machine 1448 is hosted by a host operating system (operating system 1414 in FIG. 15) and typically, although not always, has a virtual machine monitor 1446, which manages the operation of the virtual machine 1448 as well as the interface with the host operating system (i.e., operating system 1414). A software architecture executes within the virtual machine 1448 such as an operating system 1450, libraries 1452, frameworks/middleware 1454, applications 1456 or presentation layer 1458. These layers of software architecture executing within the virtual machine 1448 can be the same as corresponding layers previously described or may be different.

Figure 15:
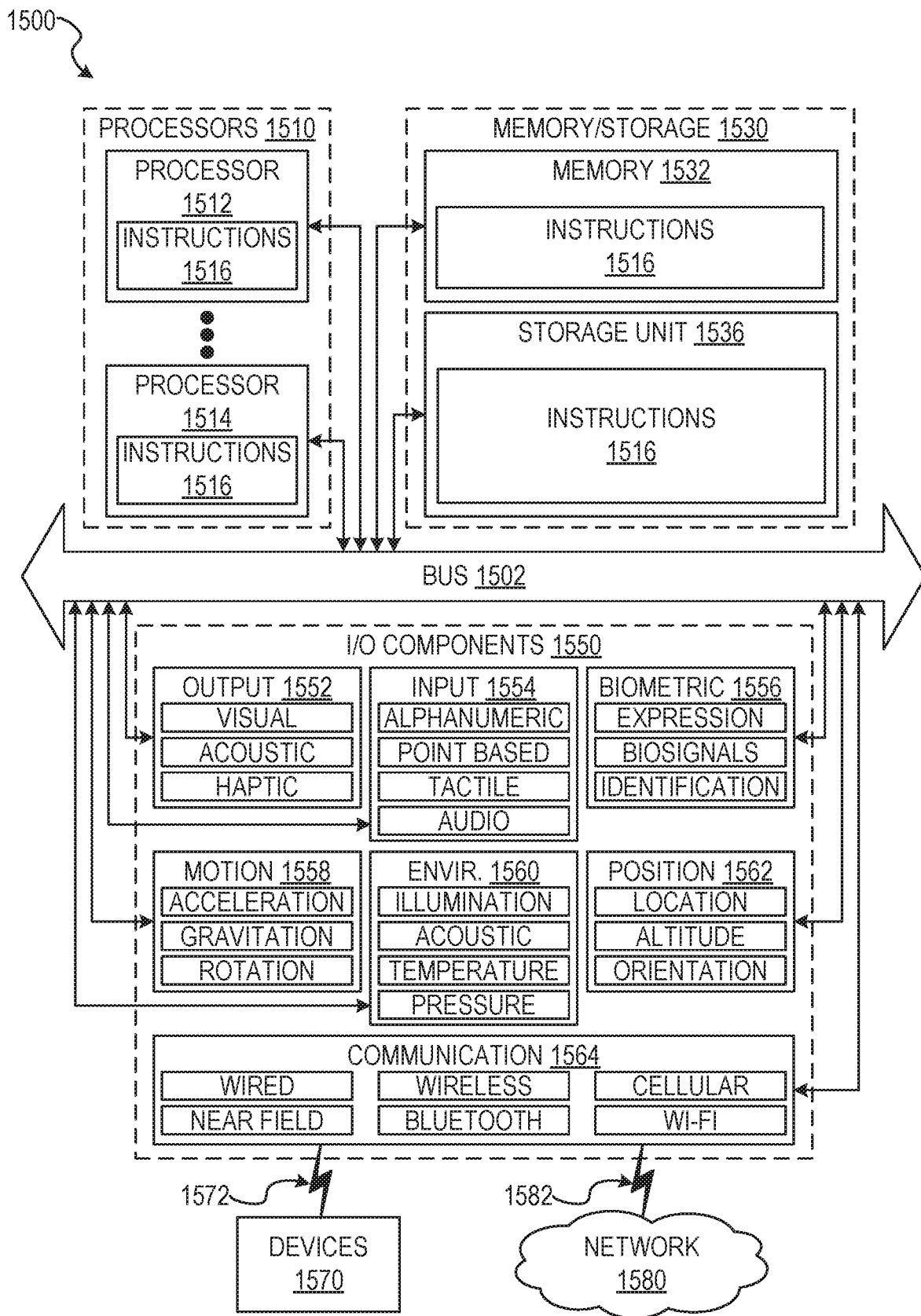
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. For example, the instructions 1516 can cause the machine 1500 to execute the flow diagrams of FIGS. 3-11. Additionally, or alternatively, the instructions 1516 can implement the presentation module 210, the communication module 220, the data module 230, the social module 240, the analysis module 250, the service prediction module 260, the provider prediction module 270, and so forth. The instructions 1516 transform the general, non-programmed machine into a particular machine programmed to carry out the described and illustrated functions in the manner described. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 can include processors 1510, memory/storage 1530, and I/O components 1550, which can be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1512 and processor 1514 that may execute instructions 1516. The term "processor" is intended to include multi-core processor that may comprise two or more independent processors (sometimes referred to as "cores") that can execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory/storage 1530 can include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 can also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 can include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 can include output components 1552 and input components 1554. The output components 1552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1550 can include biometric components 1556, motion components 1558, environmental components 1560, or position components 1562 among a wide array of other components. For example, the biometric components 1556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 can include acceleration sensor components (e.g., an accelerometer), gravitation sensor components, rotation sensor components (e.g., a gyroscope), and so forth. The environmental components 1560 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or other suitable device to interface with the network 1580. In further examples, communication components 1564 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 can detect identifiers or include components operable to detect identifiers. For example, the communication components 1564 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, and the like. a Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or other type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 can be transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, the instructions 1516 can be transmitted or received using a transmission medium via the coupling 1572 (e.g., a peer-to-peer coupling) to devices 1570. The term "transmission medium" shall be taken to include any intangible medium that is capable of storing, encoding, or carrying the instructions 1516 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing member data of members of an online service;
   obtaining labels for the member data, the labels each indicating whether a corresponding member data is associated with a member who is a freelancer member or who is not a freelancer member;
   training a machine-learned prediction model using the member data and the labels as ground truth data;
   detecting a member event, associated with a first member;
   in response to the detecting:
      identifying a service request based on the member event, wherein the identifying comprises:
         accessing historical service data indicating services other members of the online service have used along with member events of the other members; and
         correlating the member events of the other members with services used by the other members to identify a rule to predict what services may be needed or desired following the member event;
      accessing member data for a first plurality of members of the online service;
      extracting features from the member data for the first plurality of members of the online service;
      using the machine-learned prediction model to infer that one or more of the members in the first plurality of members are freelancer members based on their similarity to members in the training data that have been labeled as freelancer members, the similarity based on the extracted features; and
      identifying that the service request is capable of being fulfilled by one or more of the inferred one or more freelancer members based on a service request skill associated with the service request and a freelancer skill of the corresponding freelancer member;
      causing presentation, on a user interface of a user device of at least one of the one or more members in the first plurality of members inferred to be freelancer members and capable of fulfilling the service request.

2. The method of claim 1, wherein the features include job titles.

3. The method of claim 1, wherein the machine-learned prediction model is a logistic regression model.

4. The method of claim 1, wherein the machine-learned prediction model is a Naïve Bayes model.

5. The method of claim 1, wherein the machine-learned prediction model is a support vector machines model.

6. The method of claim 1, wherein the machine-learned prediction model is a decision trees model.

7. The method of claim 1, wherein the machine-learned prediction model is a neural network model.

8. The method of claim 1, wherein the machine-learned prediction model is further used to infer that one or more of the one or more members in the first plurality of members has a particular skill corresponding to the service request.

9. The method of claim 8, wherein the machine-learned prediction model is further used to calculate a match score for each of the one or more of the one or more members in the first plurality of members, the match score indicative of a level of capability of fulfilling the service request.

10. A system comprising:
    a non-transitory computer-readable medium having instructions stored thereon, which, when executed by a processor, cause the system to:
    access member data of members of an online service;
    obtain labels for the member data, the labels each indicating whether a corresponding member data is associated with a member who is a freelancer member or who is not a freelancer member;
    train a machine-learned prediction model using the member data and the labels as ground truth data;
    detect a member event associated with a first member;
    in response to the detecting:
       identify a service request based on the member event, wherein the identifying comprises:
          access historical service data indicating services other members of the online service have used along with member events of the other members; and
          correlate the member events of the other members with services used by the other members to identify a rule to predict what services may be needed or desired following the member event;
       access member data for a first plurality of members of the online service;
       extract features from the member data for the first plurality of members of the online service;
    use the machine-learned prediction model to infer that one or more of the members in the first plurality of members are freelancer members based on their similarity to members in the training data that have been labeled as freelancer members, the similarity based on the extracted features; and
    identify that the service request is capable of being fulfilled by one or more of the inferred one or more freelancer members based on a service request skill associated with the service request and a freelancer skill of the corresponding freelancer member;
    cause presentation, on a user interface of a user device of at least one of the one or more members in the first plurality of members inferred to be freelancer members and capable of fulfilling the service request.

11. The system of claim 10, wherein the features include job titles.

12. A machine-readable medium having no transitory signals and storing instructions that, when executed by at least one processor of a machine, cause the machine to perform operations comprising:
    accessing member data of members of an online service;
    obtaining labels for the member data, the labels each indicating whether a corresponding member data is associated with a member who is a freelancer member or who is not a freelancer member;
    training a machine-learned prediction model using the member data and the labels as ground truth data;
    detecting a member event associated with a first member;
    in response to the detecting:
       identifying a service request based on the member event, wherein the identifying comprises:

accessing historical service data indicating services other members of the online service have used along with member events of the other members; and correlating the member events of the other members with services used by the other members to identify a rule to predict what services may be needed or desired following the member event;

accessing member data for a first plurality of members of the online service;

extracting features from the member data for the first plurality of members of the online service;

using the machine-learned prediction model to infer that one or more of the members in the first plurality of members are freelancer members based on their similarity to members in the training data that have been labeled as freelancer members, the similarity based on the extracted features; and identifying that the service request is capable of being fulfilled by one or more of the inferred one or more freelancer members based on a service request skill associated with the service request and a freelancer skill of the corresponding freelancer member;

causing presentation, on a user interface of a user device of at least one of the one or more members in the first plurality of members inferred to be freelancer members and capable of fulfilling the service request.

13. The machine-readable medium of claim 12, wherein the features include job titles.

14. The machine-readable medium of claim 12, wherein the machine-learned prediction model is a logistic regression model.

15. The machine-readable medium of claim 12, wherein the machine-learned prediction model is a Naïve Bayes model.

16. The machine-readable medium of claim 12, wherein the machine-learned prediction model is a support vector machines model.

17. The machine-readable medium of claim 12, wherein the machine-learned prediction model is a decision trees model.

18. The machine-readable medium of claim 12, wherein the machine-learned prediction model is a neural network model.

19. The machine-readable medium of claim 12, wherein the machine-learned prediction model is further used to infer that one or more of the one or more members in the first plurality of members has a particular skill corresponding to the service request.

20. The machine-readable medium of claim 19, wherein the machine-learned prediction model is further used to calculate a match score for each of the one or more of the one or more members in the first plurality of members, the match score indicative of a level of capability of fulfilling the service request.

* * * * *